United States Patent Office 3,363,005
Patented Jan. 9, 1968

3,363,005
PROCESS FOR PREPARING 1,4-DICHLORO-
2,5-DIMETHOXYBENZENE
Jose R. Alvarez, Wilmington, Del., assignor to E. I. du
Pont de Nemours and Company, Wilmington, Del., a
corporation of Delaware
No Drawing. Filed July 30, 1965, Ser. No. 476,144
5 Claims. (Cl. 260—613)

This invention relates to the chlorination of p-dimethoxybenzene.

More particularly, it relates to an improved process for dichlorinating p-dimethoxybenzene by dissolving this compound in a halogenated hydrocarbon solvent having a boiling point between 40 and 140° C. and reacting elemental chlorine with the p-dimethoxybenzene at 20 to 100° C. in the presence of a lower alcohol modified anhydrous aluminum chloride catalyst.

It has recently been discovered that 1,4-dichloro-2,5-dimethoxybenzene is a potentially useful chemical for protecting plants from the ravages of soil fungi. See U.S. patent application Ser. No. 343,969, filed Feb. 11, 1964 and now Patent No. 3,265,564. The commercial potential of the aforementioned compound has, of course, created interest in an economical process for obtaining high yields of 1,4-dichloro-2,5-dimethoxybenzene.

Important requirements for any process producing 1,4-dichloro-2,5-dimethoxybenzene are that the final product be free of byproducts injurious to plant life and that a maximum yield of the desired material be achieved. Heretofore known processes for synthesizing 1,4-dichloro-2,5-dimethoxybenzene are contaminated with undesirable byproducts of a type which cause injury to plants and provide relatively low yields of the desired product. These processes are undesirable for two reasons. First, separation of the injurious byproducts from the desired product is an expensive procedure. Secondly, low yields of the desired product represent an obvious waste of raw materials.

I have discovered a process for the chlorination of dimethoxybenzene with elemental chlorine which gives approximately a 90% yield of 1,4-dichloro-2,5-dimethoxybenzene and a product containing less than 1% of impurities of a type which cause plant injury.

In the process of my invention, p-dimethoxybenzene is dissolved in a halogenated hydrocarbon solvent having a boiling point in the range of 40 to 140° C. The solution should contain approximately 10 to 50% by weight of the p-dimethoxybenzene. It can be even more dilute, but this is less preferred because of economic considerations. Solvents such as methylene chloride, chloroform, carbon tetrachloride, tetrachloroethylene, and 1,2-difluoro-1,1,2,2-tetrachloroethane are satisfactory. Preferred solvents are carbon tetrachloride and 1,2-difluoro-1,1,2,2-tetrachloroethane. Mixtures of any of the above solvents also can be used to give a particularly desired solvent mix.

Aluminum chloride is added to the reaction mixture in the ratio of 0.02 to 0.10 mole per mole of p-dimethoxybenzene. A lower alkanol is then added in the ratio of 0.5 to 2.5 moles per mole of aluminum chloride. The lower alkanols can be methanol, ethanol, isopropanol, propanol, butanol, t-butanol, isobutanol, sec-butanol. The preferred alcohols are methanol and ethanol.

Liquid or gaseous chlorine is introduced into the system below the surface of the reaction mixture along with rapid agitation. Two to 2.1 moles of elemental chlorine per mole of p-dimethoxybenzene is used. It is preferred to use 2.05 moles of elemental chlorine per mole of p-dimethoxybenzene. The reaction is carried out at atmospheric pressure and at a temperature of 20 to 100° C. A temperature of 50 to 90° C. is preferred. Most preferred is a temperature of 60 to 80° C. The reaction time depends on the efficiency of heat removal and can vary from a few minutes to three hours.

In the above process, the aluminum chloride catalyst is critical since it encourages the production of 1,4-dichloro-2,5-dimethoxybenzene and diminishes the formation of other ring-chlorinated derivatives of p-dimethoxybenzene. While all these derivatives are not harmful to plants, they are not as active against soil fungi and therefore are not desired. The lower alcohol is critical since it moderates the effect of the aluminum chloride catalyst preventing the formation of high-boiling and acidic components. These high-boiling and acidic components were found, in greenhouse tests, to cause injury to plants.

My process produces a high purity product containing approximately 90% by weight of 1,4-dichloro-2,5-dimethoxybenzene, the balance being predominantly monochloro-, trichloro-, and other dichloro derivatives of dimethoxybenzene. Less than 1% by weight of phytotoxic acidic and high-boiling impurities are present in the product.

The following Examples 1 through 4 set forth additional examples of the process of my invention. The remaining examples are provided to show the undesirable results obtained by varying the critical steps of my process. All percents are by weight unless otherwise indicated.

*Example 1*

Exactly 120 parts by weight of p-dimethoxybenzene is dissolved in 960 parts by weight of carbon tetrachloride contained in a glass vessel equipped with an agitator, a water jacket for heating or cooling, a reflux condenser and a gas inlet tube at the bottom for the introduction of chlorine gas. A quantity of 6.2 parts by weight of anhydrous aluminum cholride is then added, followed by 2.23 parts by weight of methanol. The batch is then heated to 68° C. and chlorine gas addition is begun. After adding 127 parts by weight of chlorine gas over a period of 60 minutes, controlling the temperature at 68° C., chlorine addition is stopped and 200 parts by weight of water is added. The mixture is refluxed for 10 minutes, then allowed to settle. The aqueous layer is siphoned off and the organic phase rewashed first with 200 parts by weight aqueous 5% sodium hydroxide and then with 200 parts by weight water.

After decantation of the water, a sample of the carbon tetrachloride solution is analyzed. On a solvent-free basis, the sample contains:

| | Percent |
|---|---|
| 2-chloro-1,4-dimethoxybenzene | 0.3 |
| 2,3-dichloro-1,4-dimethoxybenzene | 2.2 |
| 1,4-dichloro-2,5-dimethoxybenzene | 91.3 |
| 2,6-dichloro-1,4-dimethoxybenzene | 3.7 |
| 2,3,5-trichloro-1,4-dimethoxybenzene | 2.1 |
| "High boilers" | 0.1 |
| "Acidic material" | 0.3 |
| | 100.0 |

The carbon tetrachloride solvent is then distilled off. After the pot temperature reaches 125° C., approximately 20 parts by weight of water is introduced over a period of 20 minutes to steam distill traces of carbon tetrachloride. The molten product is then solidified on a conventional drum flaker. The weight yield of crude product is 209 parts by weight.

*Example 2*

The process of Example 1 is carried out substituting 984 parts by weight Freon® 112 (1,2-difluoro-1,1,2,2- tetrachloroethane) for the carbon tetrachloride and maintaining a reaction temperature of 85° C. Analysis of the chlorination product on a solvent-free basis is:

| | Percent |
|---|---|
| Monochloro-1,4-dimethoxybenzene | 0.0 |
| 2,3-dichloro-1,4-dimethoxybenzene | 2.0 |
| 1,4-dichloro-2,5-dimethoxybenzene | 90.2 |
| 2,6-dichloro-1,4-dimethoxybenzene | 3.2 |
| Trichloro-1,4-dimethoxybenzene | 4.2 |
| "High boilers" | 0.0 |
| "Acidic material" | 0.4 |
| | 100.0 |

*Example 3*

In the process of Example 1, 980 parts by weight of tetrachloroethylene is used as solvent instead of carbon tetrachloride and a reaction temperature of 77° C. is maintained. The product analysis is substantially identical to that of Example 2.

*Example 4*

Into a mixture of 120 parts by weight of p-dimethoxybenzene, 960 parts by weight of carbon tetrachloride, 6.2 parts by weight of anhydrous aluminum chloride and .74 part by weight of methanol is added 127 parts by weight of chlorine over a one-hour period with the temperature kept at 68° C. Analysis of the chlorination product after workup on a solvent-free basis as in Example 1 is:

| | Percent |
|---|---|
| 2,3-dichloro-1,4-dimethoxybenzene | 1.2 |
| 1,4-dichloro-2,5-dimethoxybenzene | 90.5 |
| 2,6-dichloro-1,4-dimethoxybenzene | 2.7 |
| Trichloro-1,4-dimethoxybenzene | 5.2 |
| "High boilers" | 0.2 |
| "Acidic material" | 0.2 |
| | 100.0 |

*Example 5*

Into a mixture of 120 parts by weight of p-dimethoxybenzene, 980 parts by weight of carbon tetrachloride and 6.2 parts by weight of anhydrous aluminum chloride is introduced 127 parts by weight of chlorine gas over a three-hour period with the temperature kept at 20° C. Using the same workup procedure as in Example 1, the analysis of the chlorination product on a solvent-free basis is:

| | Percent |
|---|---|
| Monochloro-1,4-dimethoxybenzene | 3.0 |
| 2,3-dichloro-1,4-dimethoxybenzene | 0.2 |
| 1,4-dichloro-2,5-dimethoxybenzene | 87.8 |
| 2,6-dichloro-1,4-dimethoxybenzene | 2.0 |
| Trichloro-1,4-dimethoxybenzene | 2.4 |
| "High boilers" | 3.6 |
| "Acidic material" | 1.0 |
| | 100.0 |

In this example no methanol was used to modify the anhydrous aluminum chloride. The product contains 4.6% of plant toxic contaminants. This increase in toxic contaminants is more than 10 times the products in Examples 1 through 4.

*Example 6*

Into a mixture of 120 g. p-dimethoxybenzene, 670 parts by weight of carbon tetrachloride and 2.23 parts by weight of methanol is introduced 127 parts by weight of chlorine gas over a one-hour period with the temperature kept at 73° C. Analysis of the washed chlorination product on a solvent-free basis is:

| | Percent |
|---|---|
| p-Dimethoxybenzene | 0.9 |
| Monochloro-1,4-dimethoxybenzene | 19.4 |
| 2,3-dichloro-1,4-dimethoxybenzene | 3.5 |
| 1,4-dichloro-2,5-dimethoxybenzene | 19.0 |
| 2,6-dichloro-1,4-dimethoxybenzene | 0.5 |
| Trichloro-1,4-dimethoxybenzene | 8.0 |
| "High boilers" | 3.7 |
| "Acidic material" | 45.0 |
| | 100.0 |

In this example no anhydrous aluminum chloride is used in the process. The result is the production of just 19% of the desired 1,4-dichloro-2,5-dimethoxybenzene. The amount of contaminants present is extremely high.

*Example 7*

Into a mixture of 120 parts by weight of p-dimethoxybenzene, 960 parts by weight of carbon tetrachloride, 6.2 parts by weight of anhydrous aluminum chloride and 4.45 parts by weight of methanol is added 128.5 parts by weight of chlorine gas over a one-hour period with the temperature kept at 50° C. Using the same workup procedure as in Example 1, the analysis of the chlorination product on a solvent-free basis is:

| | Percent |
|---|---|
| Monochloro-1,4-dimethoxybenzene | 0.3 |
| 2,3-dichloro-1,4-dimethoxybenzene | 1.2 |
| 1,4-dichloro-2,5-dimethoxybenzene | 89.6 |
| 2,6-dichloro-1,4-dimethoxybenzene | 2.9 |
| Trichloro-1,4-dimethoxybenzene | 3.4 |
| "High boilers" | 0.1 |
| "Acid material" | 2.5 |
| | 100.0 |

In this example a greater amount of methanol is used than in Examples 1 through 4 and the result is a sixfold increase in the amount of plant toxic byproducts.

I claim:
1. In a process for chlorinating p-dimethoxybenzene to form 1,4-dichloro-2,5-dimethoxybenzene the improvement comprising dissolving the p-dimethoxybenzene in a halogenated hydrocarbon solvent having a boiling point between 40 and 140° C. and reacting elemental chlorine with the p-dimethoxybenzene at 20 to 100° C. in the presence of a lower alkanol modified anhydrous aluminum chloride catalyst, the anhydrous aluminum chloride being present in the ratio of 0.02 to 0.10 mole per mole of p-dimethoxybenzene and the lower alkanol being present in the ratio of 0.5 to 2.5 moles per mole of aluminum chloride.
2. The process according to claim 1 wherein the solvent is carbon tetrachloride.
3. The process according to claim 1 wherein the solvent is 1,2-difluoro-1,1,2,2-tetrachloroethane.
4. The process according to claim 1 wherein the lower alkanol is methanol.
5. The process according to claim 1 wherein the lower alkanol is ethanol.

References Cited

Akerman et al.: Journal of Applied Chemistry, vol. 3 (1953), pp. 416–418.

Castelfranchi et al.: Chemical Asbtracts, vol. 48 (1954), p. 10650f.

Chigi: Bollettino Scientifico, University of Bologna, vol. 5 (1947), pp. 38–41.

Olah: Friedel-Crafts and Related Reactions, vol. 1 (1963), pp. 206–208, 212, 214, 245 and 284–290.

Rodd: Chemistry of Carbon Compounds, vol. 3, part A (1954), p. 425.

BERNARD HELFIN, *Primary Examiner.*